(No Model.) 2 Sheets—Sheet 1.
H. E. & J. F. DODGE.
BICYCLE BEARING.
No. 567,851. Patented Sept. 15, 1896.
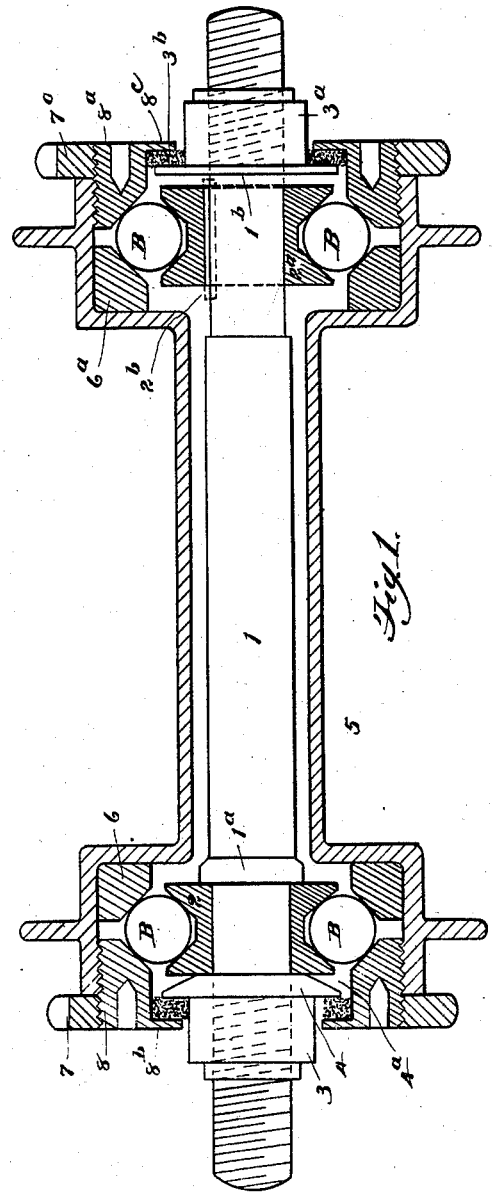
WITNESSES
H. Clough.
D. W. Bradford
INVENTORS
Horace E. Dodge
John F. Dodge
By Parker & Burton
Attorneys.

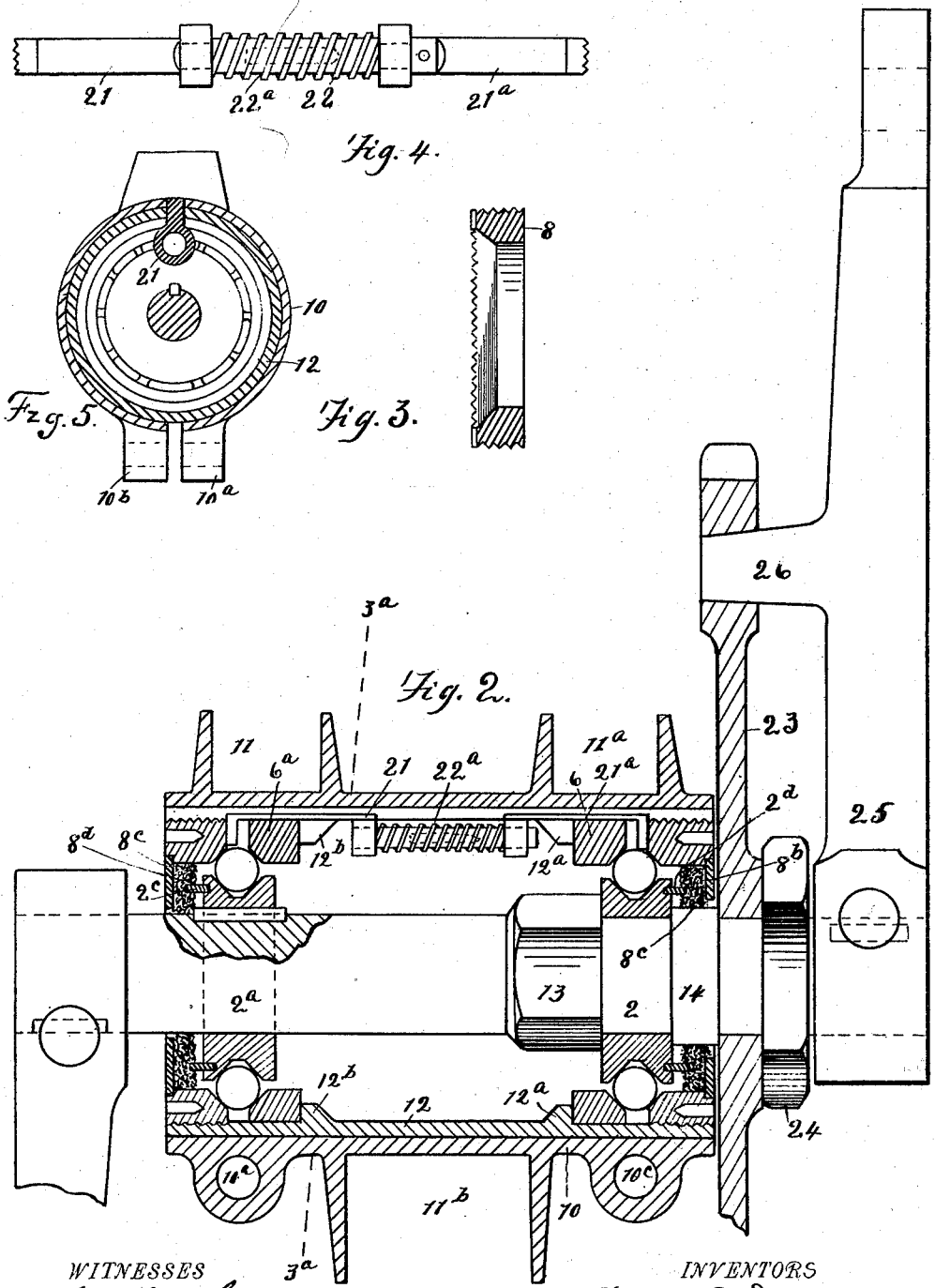

UNITED STATES PATENT OFFICE.

HORACE E. DODGE AND JOHN F. DODGE, OF DETROIT, MICHIGAN.

BICYCLE-BEARING.

SPECIFICATION forming part of Letters Patent No. 567,851, dated September 15, 1896.

Application filed July 20, 1895. Serial No. 556,595. (No model.)

*To all whom it may concern:*

Be it known that we, HORACE E. DODGE and JOHN F. DODGE, citizens of the United States, residing at Detroit, county of Wayne, State of Michigan, have invented a certain new and useful Improvement in Bicycle-Bearings; and we declare the following to be a full, clear, and exact description of the invention, such as will enable others skilled in the art to which it pertains to make and use the same, reference being had to the accompanying drawings, which form a part of this specification.

This invention relates to bicycle-bearings, and has for its object improvements in the several axle-bearings of a bicycle or similar wheeled vehicle.

In the drawings, Figure 1 shows in section the main wheel-axle. Fig. 2 shows in section the crank-shaft and bearings. Fig. 3 is a cross-section at line $3^a$ $3^a$ of Fig. 2. Fig. 4 shows a detail of a holder used to prevent the outer cones of Fig. 2 from becoming unscrewed when the cone-case or inner shell is removed. Fig. 5 is a sectional view of one of the outer hollow cone-bearings.

The main feature of invention involved in this application is in the bearings. Instead of the form usually known as "cone-bearings," in which a right cone and a hollow cone are opposite to each other and the bearing-balls are interposed between, we employ two right cones, whose bearing-surfaces are so disposed as to form a V-shaped groove, within which rest the balls, and opposed are two hollow cones, which are also so disposed as to form a V-shaped groove.

Referring to Fig. 1, 1 indicates the axle, on one end of which is secured a bearing double cone or spool 2, held from movement in one direction by the collar $1^a$ and held from movement in the other direction by the nut 3 and washer 4. Between the washer 4 and the cone-spool 2 is a groove $4^a$. At the other end of the axle the spool $2^a$ is adapted to slide or move longitudinally along the shaft, but held from rotating around it by a spline $2^b$. The hub consists of a shell 5, enlarged at each end and internally screw-threaded. Into the sockets formed by the enlarged ends of the shell are inserted, first, the inner bearing hollow cones 6 $6^a$, and, second, the outer bearing hollow cones 8 $8^a$. The latter cones are screw-threaded and engage with the screw-threads of the socket, and they also project beyond the edges of the socket and receive the jam-nuts 7 $7^a$. On each of the bearing-cones 8 $8^a$ is a collar $8^b$ $8^c$, that extends inward toward the nut 3 $3^a$, and between the collar $8^b$ and the washer 4 is a space adapted to be filled by some soft dust-arresting material, preferably felt. A similar space is formed between the collar $8^c$ and a collar $3^b$ on the nut $3^a$. When the parts are assembled, the requisite number of balls B B are placed in the grooves and the spool $2^a$ adjusts itself along the axle 1, the nut 3 presses the spool 2 closely against the collar $1^a$, and the nut $3^a$ presses against a shoulder $1^b$. The bearings are free from all strain from such nuts. It is practically impossible to tighten the cone-nuts 8 $8^a$ so as to prevent the free rotation of the wheel on the axle, and the self-adjusting spool $2^a$ prevents strain from one spool to the other. In connection with the crank-shaft there is the same feature of self-adjusting spools, but inasmuch as the crank-shaft rotates and the case is held fixed there are changes of construction. There are two cases—an outer case 10, split on the under side and provided with bolt-ears $10^a$ $10^b$ $10^c$ and with frame-sockets 11 $11^a$ $11^b$, an inner case 12, also split, but with the split turned upward. The inner case is screw-threaded at each end and with interior collars $12^a$ $12^b$, against which the inner cones 6 $6^a$ abut. The spool $2^a$ is held from rotating on the shaft by a spline, but free to adjust itself lengthwise, and the spool 2 is held by nut 13 against collar 14. In each of the spools 2 $2^a$ is a ring concentric with the shaft and extending toward the end of the shaft. Between the ring $2^c$ on one end and the inward-extending collar $8^c$ is interposed the felt absorbing dust-guard $8^d$, and between the corresponding ring $2^d$ and the collar $8^b$ is interposed the felt ring $8^e$.

Instead of the external jam-nut we use the device shown in detail in Fig. 4, and this lies entirely within the case and between the edges of the inner split case. It consists of two bolts 21 $21^a$, strained apart by the spring 22. Preferably this is a coiled spring on a core $22^a$, which passes through holes in the upturned ends of the bolts 21 $21^a$. The outer end of each bolt 21 21ª is serrated, and engages with serrations or knurls in the inner end or face of the bearing-nuts 8 8ª.

On one protruding end of the shaft 1 is secured, first, a sprocket-wheel 23; next, a nut 24, and, finally, a pedal-arm 25. The sprocket-wheel 23 is held firmly against the collar 14 by the left-handed nut 24, and the pedal-arm is keyed to the shaft 1 in the usual manner. The sprocket-wheel 23 is further secured to the shaft 1 by a projection 26 on the back of the pedal-arm, which extends through a suitable hole in the rim of the sprocket-wheel 23. To the other end of the shaft 1 is secured the second pedal-arm.

The entire inner casing of the crank axle-bearing can be easily removed after the pedal-arm has been taken off the end opposite the sprocket by loosening the bolts in the eyes 10ᵇ 10ᶜ, and the removed bearing can be immersed in benzene and washed without disassembling the cones or removing the balls.

The V-shaped groove in the spools and the V-shaped groove that is formed between the rings which constitute the hollow cones together form an opening that is substantially square in cross-section and presents four bearing-points to the balls.

What we claim is—

1. In a bearing for wheel-hubs, the combination of a shell provided at each end with a bearing consisting of two complementary sections shaped to form a groove between them and one movable with respect to the other, an axle, a fixed grooved bearing at one end thereof, and a grooved bearing at the opposite end loosely supported to have a free longitudinal movement on the axle, substantially as described.

2. In an axle-bearing for wheels, an outer split case provided with means whereby it may be attached to the vehicle-frame and with means whereby it may be contracted on an inner shell ball-bearing cones adapted to be inserted in the inner shell and arranged to form a grooved V-shaped track, an axle provided with cone-bearings also arranged to form a V-shaped track, one of said bearings being adapted to move longitudinal of the axis of the hub whereby there is provided a firm point-contact to each ball so arranged that the counter-bearings on shaft and axle are self-adjusting.

3. In an axle-bearing for wheels, an outer split shell, provided with means whereby it may be contracted, an inner split shell threaded at its ends, threaded cone-bearings adapted to engage with the inner shell and knurled on their inner faces, a spring-pressed holder adapted to engage the knurled faces, substantially as described.

In testimony whereof we sign this specification in the presence of two witnesses.

HORACE E. DODGE.
JOHN F. DODGE.

Witnesses:
CHARLES F. BURTON,
F. CLOUGH.